United States Patent
Edling et al.

(10) Patent No.: US 7,269,687 B2
(45) Date of Patent: Sep. 11, 2007

(54) BOUNDING DEFECTIVE REGIONS OF A TAPE STORAGE MEDIUM

(75) Inventors: Dwayne A. Edling, Longmont, CO (US); Charles Klomp, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 503 days.

(21) Appl. No.: 10/923,443

(22) Filed: Aug. 20, 2004

(65) Prior Publication Data

US 2006/0041781 A1 Feb. 23, 2006

(51) Int. Cl.
G06F 12/00 (2006.01)
G11C 29/00 (2006.01)
(52) U.S. Cl. .................. 711/111; 711/156; 714/771
(58) Field of Classification Search ............... None
See application file for complete search history.

(56) References Cited

U.S. PATENT DOCUMENTS

| | | | |
|---|---|---|---|
| 4,058,219 A | 11/1977 | Quinn | |
| 4,152,053 A | 5/1979 | Menary | |
| 4,214,280 A | 7/1980 | Halfhill et al. | |
| 4,255,807 A | 3/1981 | Cosby | |
| 4,933,566 A | 6/1990 | Masaaki et al. | |
| 5,167,161 A | 12/1992 | Okamoto et al. | |
| 5,200,960 A | 4/1993 | Hamilton | |
| 5,331,476 A | 7/1994 | Fry et al. | |
| 5,357,150 A | 10/1994 | Jaquette | |
| 5,369,652 A | 11/1994 | Bailey et al. | |
| 5,383,776 A | 1/1995 | Trail et al. | |
| 5,488,525 A | 1/1996 | Adams et al. | |
| 5,570,242 A | 10/1996 | Leonhardt et al. | |
| 5,613,082 A | 3/1997 | Brewer et al. | |
| 5,619,384 A | 4/1997 | Leonhardt et al. | |
| 5,689,384 A | 11/1997 | Albrecht et al. | |
| 5,719,717 A | 2/1998 | Leonhardt et al. | |
| 5,828,514 A | 10/1998 | Chliwnyj et al. | |
| 5,841,660 A | 11/1998 | Robinson et al. | |
| 5,963,389 A | 10/1999 | Wojciechowski et al. | |

(Continued)

FOREIGN PATENT DOCUMENTS

EP  0 630 022 A2  12/1994

(Continued)

OTHER PUBLICATIONS

Quantum Corporation (Feb. 26, 2004). "SDLT Format" Slide Presentation, *SSPG Quantum Corporation*, 16 pages.

(Continued)

Primary Examiner—Reginald Bragdon
Assistant Examiner—Shawn Gu
(74) Attorney, Agent, or Firm—Morrison & Foerster LLP

(57) ABSTRACT

Systems and methods for storing data on a tape medium and coping with defective regions on the tape medium are provided. The method includes: writing a plurality of envelopes of data onto the tape medium, each envelope of data comprising a plurality of blocks of data; detecting a defective region of the tape medium; writing a boundary start field after the defective region, the boundary start field indicating that the defective region has been passed; and writing a boundary end field before the defective region of the tape medium, the boundary end field indicating that the defective region follows the boundary end field.

19 Claims, 6 Drawing Sheets

U.S. PATENT DOCUMENTS

| | | | |
|---|---|---|---|
| 5,995,306 A | 11/1999 | Contreras et al. | |
| 6,019,302 A | 2/2000 | Murphy | |
| 6,021,013 A | 2/2000 | Albrecht et al. | |
| 6,186,430 B1 | 2/2001 | Zweighaft | |
| 6,266,201 B1 | 7/2001 | Dahlerud et al. | |
| 6,269,422 B1 | 7/2001 | McDonald et al. | |
| 6,282,051 B1 | 8/2001 | Albrecht et al. | |
| 6,320,719 B1 | 11/2001 | Albrecht et al. | |
| 6,341,776 B1 | 1/2002 | Whitten | |
| 6,343,342 B1 * | 1/2002 | Carlson | 711/112 |
| 6,462,904 B1 | 10/2002 | Albrecht et al. | |
| 6,557,141 B1 | 4/2003 | Gill et al. | |
| 6,614,611 B1 | 9/2003 | Zweighaft | |
| 7,047,438 B2 * | 5/2006 | Smith et al. | 714/8 |
| 2003/0044056 A1 | 3/2003 | Katt et al. | |
| 2004/0100715 A1 | 5/2004 | Smith et al. | |

FOREIGN PATENT DOCUMENTS

| | | |
|---|---|---|
| EP | 1 117 092 A2 | 7/2001 |
| EP | 1 117 092 A3 | 7/2001 |
| JP | 2005259 A | 1/1990 |
| JP | 2-179973 A | 7/1990 |
| JP | 4305728 A | 10/1992 |
| JP | 6338137 A | 12/1994 |
| JP | 10053369 A | 2/1998 |
| JP | 2000-030206 A | 1/2000 |
| JP | 2000-311401 A | 11/2000 |
| JP | 2002-074893 A | 3/2002 |
| JP | 2002-100152 A | 4/2002 |
| WO | WO-01/31651 A1 | 5/2001 |
| WO | WO-02/102051 A2 | 12/2002 |
| WO | WO-02/102051 A3 | 12/2002 |
| WO | WO-2004/036581 A1 | 4/2004 |

OTHER PUBLICATIONS

European Search Report mailed on Apr. 6, 2006 for European Patent Application No. 05255151.2, four pages.

* cited by examiner

FIG. 7

FIG. 8

BOUNDING DEFECTIVE REGIONS OF A TAPE STORAGE MEDIUM

BACKGROUND

Data is stored in a data storage device by writing the data to a storage medium in the data storage device. The stored data can be later retrieved from the storage device by reading the data from the storage medium. One example of a storage medium is tape. Tape drives may be used to read and write data to a magnetic tape medium contained within the data storage tape device. The magnetic tape medium typically comprises a thin film of magnetic material which stores the data. The tape medium may be moved by the tape drive between a pair of spaced apart reels and past a data transducer to record or read back information.

In some cases, the storage medium may contain a defect, which may have been created during the original manufacturing and assembly of the storage device, or may have developed at a later point. Defects in the tape medium are commonly the result of deviations in the manufacturing process. Two common defects are non-magnetic regions on the tape where the magnetic coating is not applied with the specified thickness or is applied with protrusions on the surface of the medium (i.e., roughness) causing loss of signal due to tape-head separation. Another common defect is creases or folds in the tape, which also causes tape-head separation. It is desirable to avoid writing data to the defective regions of the storage medium in order to avoid loss or corruption of the data stored thereon.

In conventional hard drives, a defect map may be stored on the drive in order to cope with defects on the storage medium. This defect map may include a mapping of all of the blocks of data on the hard drive, with an indication of defective blocks. When writing data to the hard drive, the defect map may be consulted in order to determine where to write data. In addition, when encountering newly discovered defects during the reading and/or writing process, the defect map can be updated accordingly to avoid future writes to the defective region.

Where the storage medium comprises a tape storage medium, some unique defect handling concerns may arise due to the linear nature of tape media. On tape media, blocks of data are stored sequentially along the length of the tape, which can be, for example, 2000 feet long. If a defect map is stored in some predefined location on the tape medium, then any time a new defect is discovered, the tape drive must rewind to that predefined location before being able to write the new defect information to the defect map. The process of winding the tape from the location of the defect to the predefined defect map location can be prohibitively slow.

BRIEF SUMMARY

In accordance with embodiments of the present invention, a method of storing data on a tape medium is provided, comprising: writing a plurality of envelopes of data onto the tape medium, each envelope of data comprising a plurality of blocks of data; detecting a defective region of the tape medium; writing a boundary start field after the defective region, the boundary start field indicating that the defective region has been passed; and writing a boundary end field before the defective region of the tape medium, the boundary end field indicating that the defective region follows the boundary end field.

In accordance with embodiments of the present invention, a tape medium for storing data is provided, wherein the data on the tape medium comprises: a plurality of envelopes of data, each envelope of data comprising a plurality of blocks of data; a boundary end field positioned sequentially immediately before a defective region of the tape medium, the boundary end field comprising information indicating to a controller that a defective region follows the boundary end field; and a boundary start field positioned sequentially immediately after the defective region, the boundary start field indicating to the controller that the defective region has been passed.

In accordance with embodiments of the present invention, a tape storage system for storing data on a tape medium is provided, comprising: a data transducer for writing data onto the tape medium; a motor for translating the tape medium across the data transducer; and a controller for controlling the data transducer and the motor such that the tape storage system writes a plurality of envelopes of data onto the tape medium, each envelope of data comprising a plurality of blocks of data, and further such that when a defective region of the tape medium is detected, a boundary start field is written onto the tape medium after the defective region, the boundary start field indicating that the defective region has been passed, and a boundary end field is written before the defective region of the tape medium, the boundary end field indicating that the defective region follows the boundary end field.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIG. 7 is a block diagram showing an exemplary format for a boundary end field, in accordance with embodiments of the present invention.

FIG. 8 is a block diagram showing an exemplary format for a boundary start field, in accordance with embodiments of the present invention.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Figure 1:
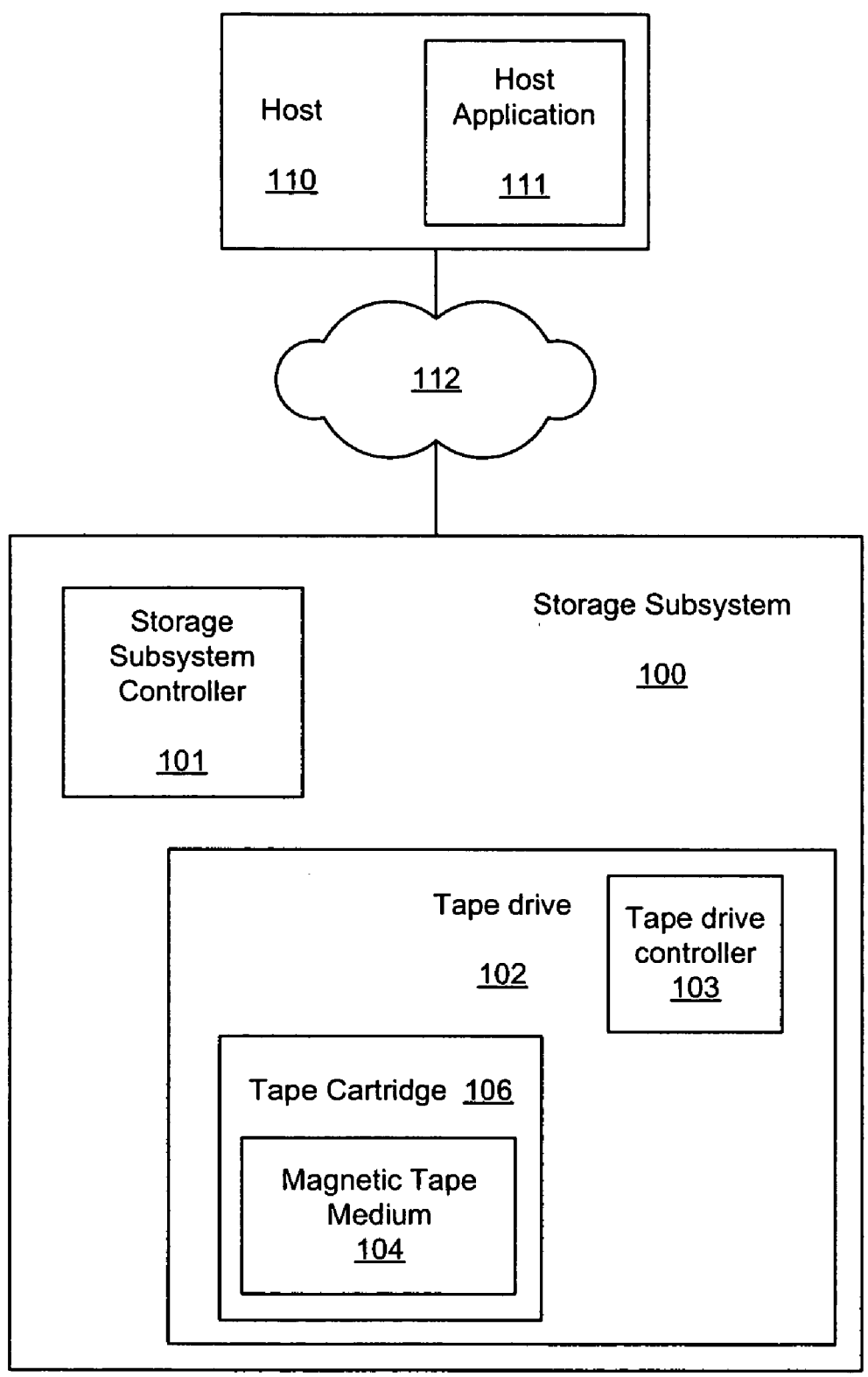
FIG. 1 is a block diagram of a tape storage subsystem, in accordance with embodiments of the present invention.

Storage subsystems, such as magnetic tape libraries, are widely used for storing information in digital form. An exemplary tape storage subsystem 100 is shown in FIG. 1. These tape subsystems 100 may include a storage subsystem controller 101 for controlling one or more tape drives 102 contained within the storage subsystem 100 and for controlling other components of the storage subsystem 100, such as the tape picker, which is used to select and load tape cartridges 106 into the tape drives 102. The storage subsystem 100 may be coupled to a host system 110 running a host application 111, which transmits I/O requests to the storage subsystem 100 via a host/storage connection 112.

The tape drive 102 reads and writes data to the data storage medium, shown in FIG. 1 as a tape medium 104. The tape medium 104 is contained within a data storage device, shown in FIG. 1 as a removable magnetic tape cartridge 106. As described above, the tape medium may be moved between a pair of reels and past a data transducer to record or read back information. In one type of tape drive, one of the reels is part of the tape drive 102 while the other reel is part of the removable tape cartridge 106. For this type of tape drive system, the reel which is a part of the tape drive 102 is commonly referred to as a take-up reel, while the reel which is a part of the tape cartridge 106 is commonly referred to as a cartridge reel. Upon insertion of the tape cartridge 106 into the tape drive 102, the tape medium 104 on the cartridge reel is coupled to the take-up reel of the tape drive 102. Subsequently, prior to removing the tape cartridge 106 from the tape drive 102, the storage tape 104 is rewound onto the cartridge reel and is then uncoupled from the take-up reel. In another type of tape drive, the data storage tape device is a tape cassette which contains both reels.

Figure 2:
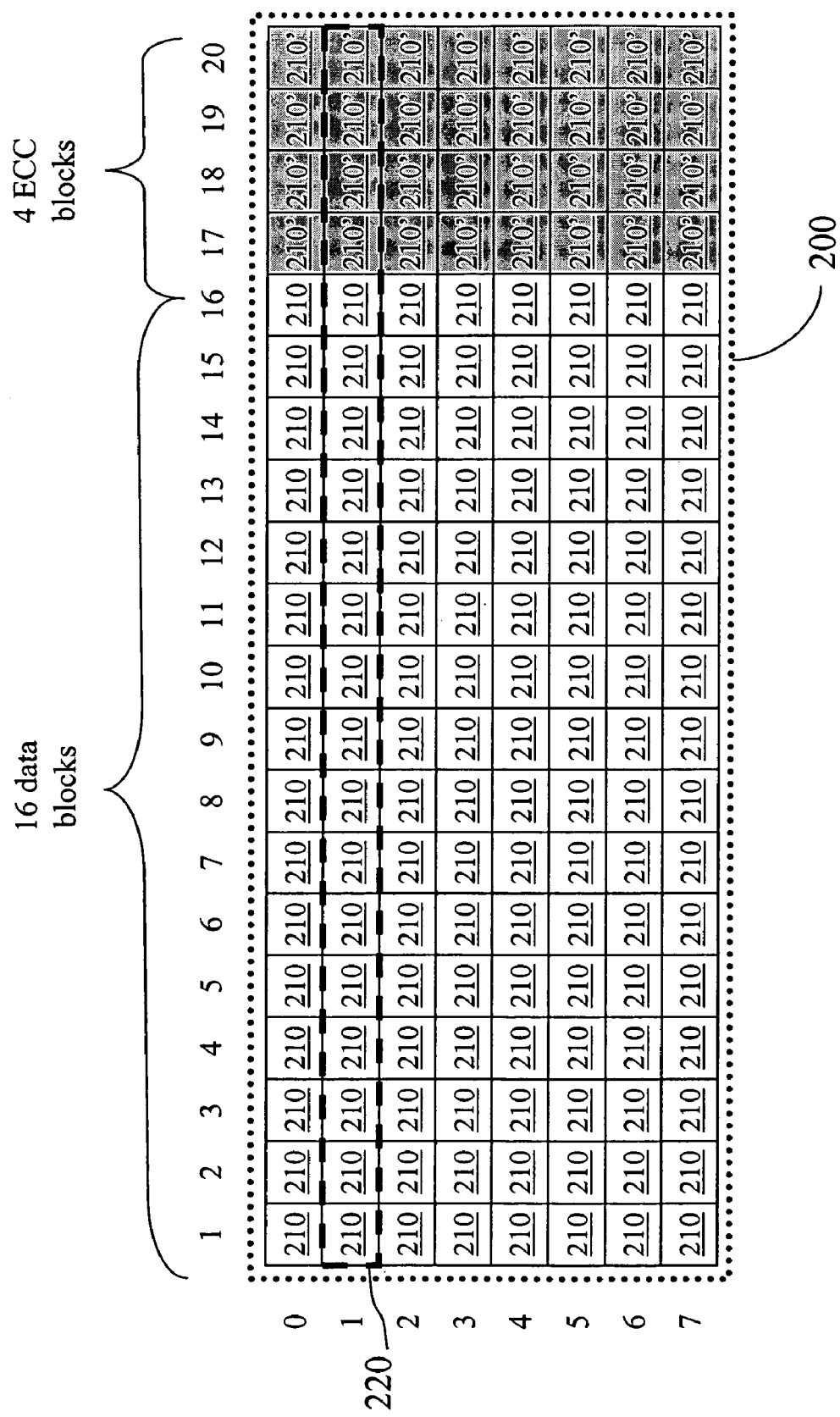
FIG. 2 is a simplified block diagram of an exemplary envelope of data, in accordance with embodiments of the present invention.

A tape drive may store data on the tape medium in the form of blocks of data. FIG. 2 shows an envelope 200 comprising a plurality of blocks 210, in accordance with embodiments of the present invention. Each block 210 may comprise, e.g., a data block corresponding to data received from the host application 111 or an ECC block 210', corresponding to an error correction code for the data blocks received from the host application 111. A group of blocks 210 may be grouped and treated as a logical unit referred to as an entity 220. A group of entities may form an envelope 200, which is shown in FIG. 2 as being comprised of 8 entities, numbered 0 through 7. Also in the embodiment shown in FIG. 2, each entity comprises 16 blocks of data and 4 blocks of error correction code (ECC). Each vertical column of blocks 210 in the envelope 200 may be referred to as a stripe. Thus, the array of blocks 210 comprises eight rows of entities 0-7 and twenty columns of stripes 1-20, with the first sixteen columns comprising data blocks and the last four columns comprising ECC blocks.

In some embodiments, the individual blocks 210 of data may be reordered within the envelope 200 so that the blocks 210 need not be stored on the tape medium in sequential order. The blocks 210 within an envelope 200 may be tagged with control fields identifying the particular data envelope 200 in which the blocks 210 are contained. In this manner, the data envelopes 200 may be sequentially ordered on the tape medium while the blocks 210 within each envelope 200 may be ordered in any fashion desired (e.g., sequential, random, ordered, or some other pseudo-ordered arrangement). Each of the rows 0 through 7 can represent a channel where data is being written by a single magnetic head. The data from each entity can be interleaved in a checkerboard fashion across these channels so that the loss of a channel minimizes the number of data blocks from that entity that will be lost on a subsequent read of that data. The data envelopes 200 may include from one up to any number of entities. In the embodiment shown in FIG. 2, the data entities comprise data blocks and ECC blocks of substantially uniform size. In other embodiments, it is possible for the data entities to not include ECC blocks and/or to utilize blocks of non-uniform size.

In some embodiments, the tape drive controller 103 may receive data from the host application 111 and generate the corresponding ECC. The tape drive controller 103 may further group the data blocks and ECC blocks into entities 220 and, in turn, organize the entities 220 into envelopes 200. In other embodiments, the generation of ECC and grouping of data may be performed by other components, such as the storage subsystem controller 101 or the host application 111.

Figure 5:
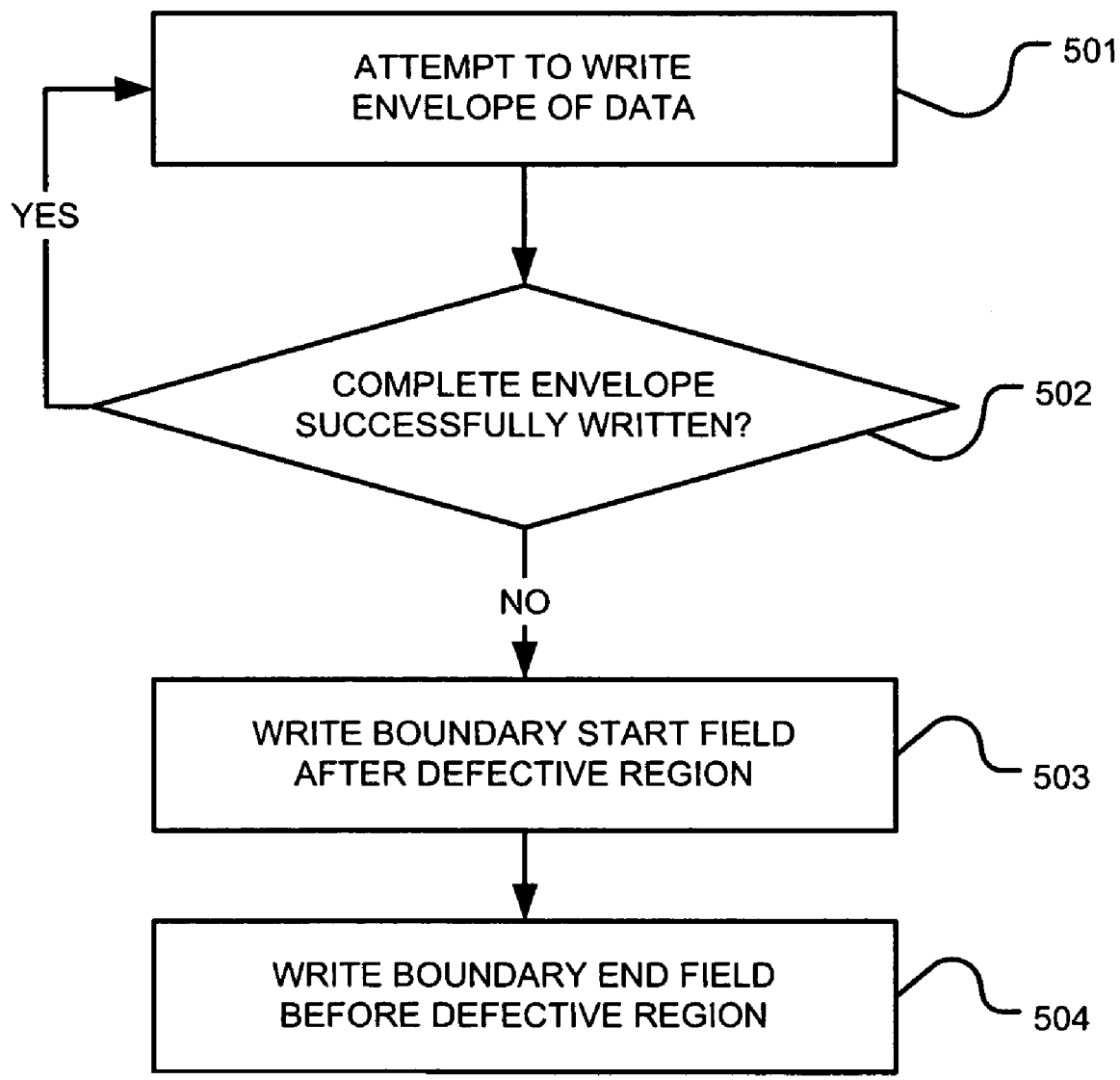
FIG. 5 is an exemplary process for bounding defective regions in a tape medium, in accordance with embodiments of the present invention.

In accordance with embodiments of the present invention, a method is provided for writing data to a tape medium, where a portion of the tape medium includes a defective region. FIG. 5 depicts an exemplary process for performing this method. In step 501, the controller attempts to write an envelope of data onto the tape medium. In step 502, it is determined whether the envelope of data has been successfully written. This determination can be performed in a variety of ways. For example, in some systems, a read-after-write configuration is used to read the data back from the tape medium immediately after the data is written. A CRC and/or ECC check can be performed on the retrieved data to determine whether any data loss or corruption has occurred. This can provide immediate feedback as to whether the envelope write was successful.

If the complete envelope has been successfully written, the process returns to step 501, in which the next envelope is written to the next sequential location on the tape medium. If there was some error during the envelope write, then in step 503, a boundary start field is written to the tape medium in a location after the defective region. This boundary start field indicates to a controller which reads data from the tape medium at some later point that the defective region has ended and that the user's data will follow. In step 504, the boundary end field is written to the tape medium in a location immediately before the defective region. The boundary end field indicates to the controller that a defective region follows the boundary end field.

During subsequent read operations, if the controller encounters a boundary end field while attempting to read an envelope of data, the controller will know that a defective region will follow. The controller will then proceed with reading the data stored in subsequent sequential locations on the tape medium. The data read during this time will be assumed to be invalid data and will be disregarded until the boundary start field is encountered. The boundary start field may include a flag or other indication that the defective region has ended. This can be accomplished using a variety of methods, as will be described in greater detail below.

After the end of the boundary start field is reached, the controller will then begin reading the next envelope of data. This transition back to reading user data can be accomplished in a variety of ways. In one embodiment, each block in the boundary start field will include a predetermined start code that indicates that the block is part of the boundary start field. Once the controller begins reading blocks of data that do not include the predetermined start code, the controller will know that the blocks of data are part of the next envelope of user data. In other embodiments, the blocks in the boundary start field will include an indication of the length of the boundary start field, as will be described in greater detail below. Thus, after the controller has passed the indicated number of blocks, it will know that the next envelope of data immediately follows. In yet other embodiments, the boundary start field will include a predetermined number of blocks. Thus, after the controller has passed the predetermined number of blocks, it will know that the next envelope of user data immediately follows.

Figure 6:
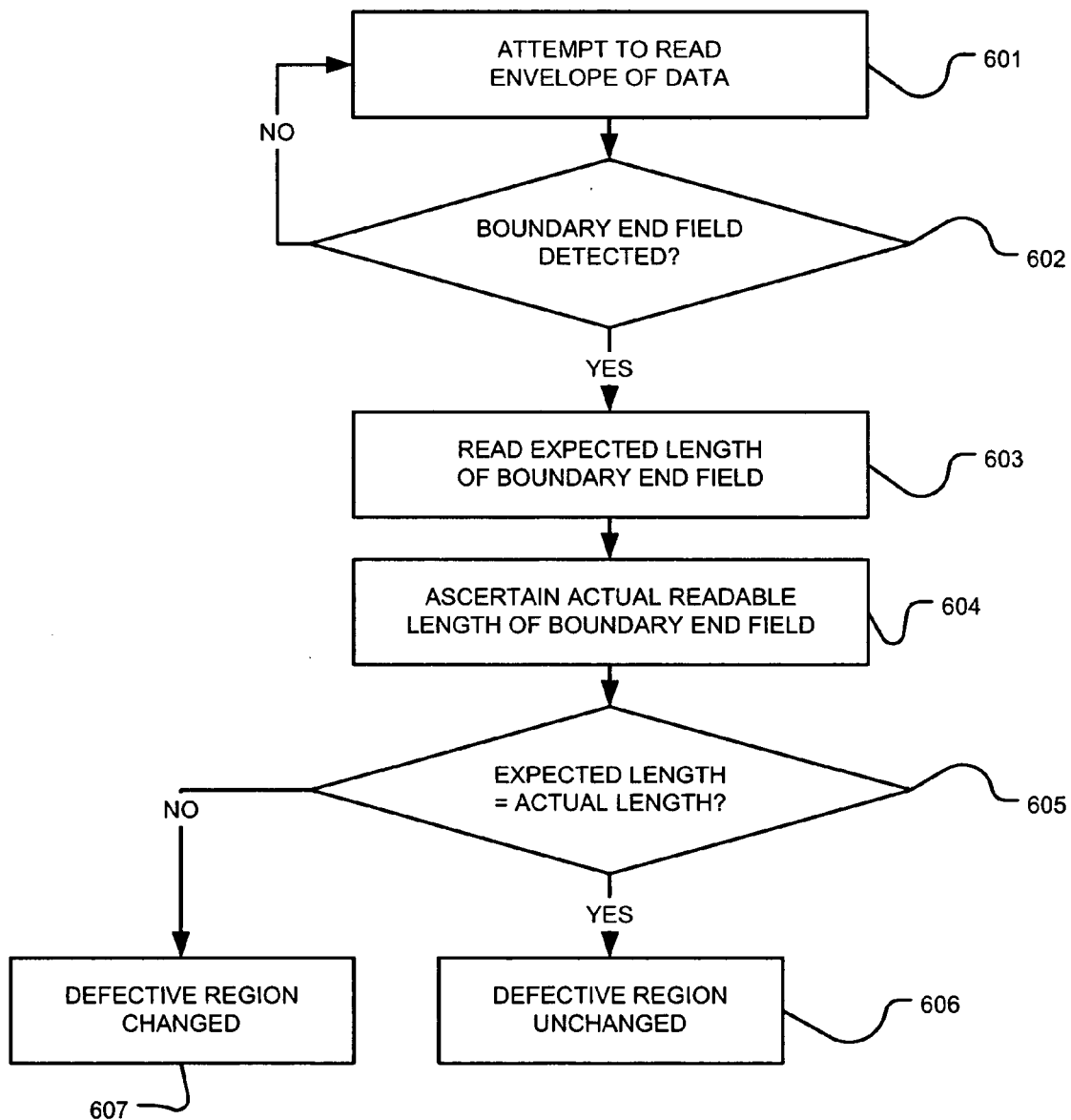
FIG. 6 is an exemplary process for monitoring changes in a defective region, in accordance with embodiments of the present invention.

In accordance with some embodiments, a process may be provided for monitoring and tracking changes in the size of the defective region over time. FIG. 6 depicts an exemplary process for reading back the data that had been written using the process described in FIG. 5 and identifying changes in the size of the defective region. In step 601, the tape drive will attempt to read an envelope of data from the tape medium. If the envelope of data is successfully read from the tape medium, then the process returns to step 601, in which the next sequential envelope of data is read.

If, instead of the expected envelope of data, a boundary end field is read from the tape medium, the controller will conclude that a defective region will follow and the process proceeds to step 603. In step 603, an expected length of the boundary end field is read. The information regarding the expected length of the boundary end field may be stored in the blocks contained within the boundary end field, as will be described in greater detail below.

Next, in step 604, the observed length of the boundary end field is determined. In step 605, the expected length of the boundary end field is compared to the observed length of the boundary end field. If the two lengths match, then it can be concluded that the defective region has not spread into the boundary end field. However, if the two lengths do not match, then an error has occurred. If the expected length is shorter than the observed length by X number of stripes, then the controller may conclude that the defective region has expanded into the boundary end field and corrupted the final X number of stripes at the end of the boundary end field.

Similarly, the controller may also compare the observed length of the boundary start field with the expected length of the boundary start field. Again, if the observed length is shorter than the expected length, the controller may conclude that the defective region has expanded forward into the boundary start field.

In some embodiments, it may be desirable to immediately cease usage of the tape storage device upon discovery that a defective region is growing. The host system may be given a warning so that the data in the area of the defect can be relocated before the data can be affected by the expansion of the defect. In other embodiments, it may be desirable to monitor and track the growth of the defective region over time. If the growth of the defective region is within an acceptable range, then it may be concluded that the tape storage device is sufficiently reliable so as to justify its continued use. If at some point, the growth of the defective region exceeds the acceptable range, then the controller may conclude that the tape storage device is no longer reliable, and may mark the entire tape storage device as defective to avoid potential catastrophic data loss from continued usage. The host application 111 on the host system 110 can be notified and the data on the tape storage device may then be relocated to another storage device or another location on the same tape medium before any further deterioration of the medium can affect the data.

Figure 3:
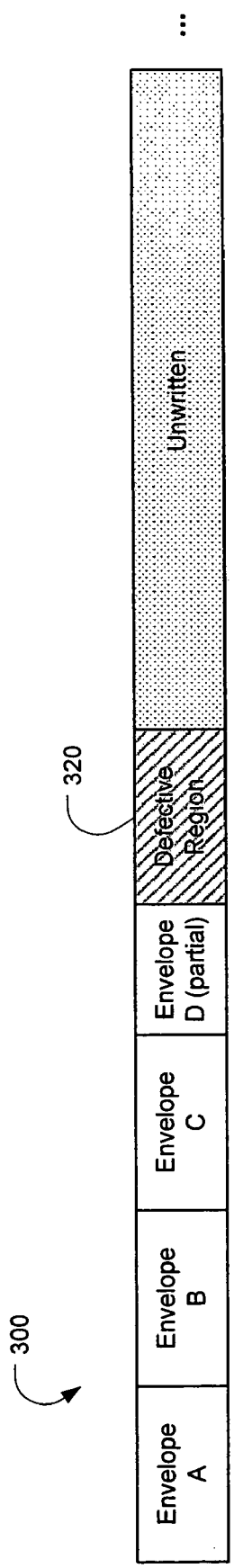
FIG. 3 is a block diagram showing a partially written envelope prior to a defective region.
Figure 4:
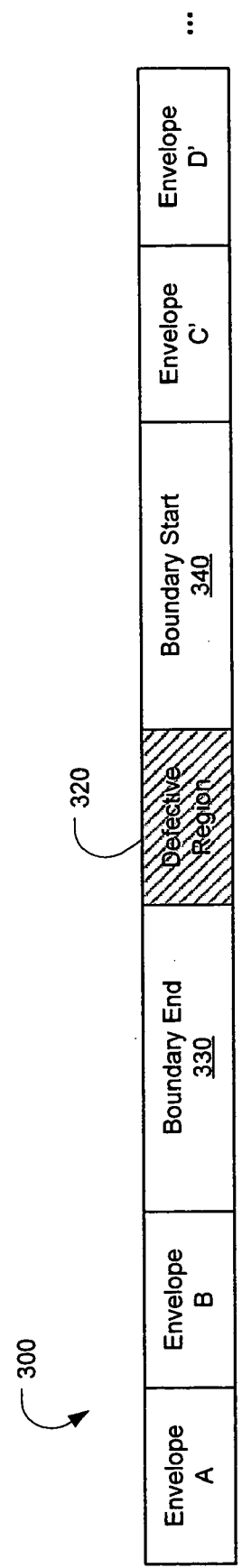
FIG. 4 is a block diagram showing boundary fields bounding the defective region on the tape medium, in accordance with embodiments of the present invention.

FIGS. 3-4 are block diagrams showing a plurality of envelopes written sequentially onto a tape medium 300, in accordance with embodiments of the present invention. In FIG. 3, envelopes A, B, and C have been successfully written onto the tape medium 300. During the writing of envelope D, a defective region 320 is encountered, thereby preventing envelope D from being completely written onto the tape medium 300.

At this point, the defect-handling process described above can be invoked. In this embodiment, the last complete, successfully written envelope located sequentially before the defective region, which is envelope C in FIG. 3, is stored into memory. The controller then positions the write head to the first acceptable, non-defective location after the defective region 320 and begins writing a boundary start field 340. After the boundary start field 340 is written, the data from envelope C is retrieved from memory and stored onto the tape medium in the next sequential position on the tape medium 300, shown in FIG. 4 as envelope C'.

Next, the controller will position the write head to the beginning of the last successfully written envelope and overwrite envelope C with a boundary end field 330. As can be seen in FIG. 4, the boundary end field 330 overwrites all of envelope C and the successfully written portion of envelope D.

In some embodiments, the controller will note the length of the defective region and will record information regarding the length of the defective region in the blocks forming either the boundary end field 330 or boundary start field 340 or both. This can assist the controller during future read operations to quickly locate the expected location of the boundary start field 340 and to provide a redundant mechanism for tracking any growth in the size of the defective region.

After the boundary end field 330 is written, the controller may reposition the write head after the rewritten envelope C' and then continue writing subsequent envelopes using conventional write operations. As shown in FIG. 4, the next envelope is envelope D', which contains the envelope of data that could not previously be fully written.

Figures 7, 8:
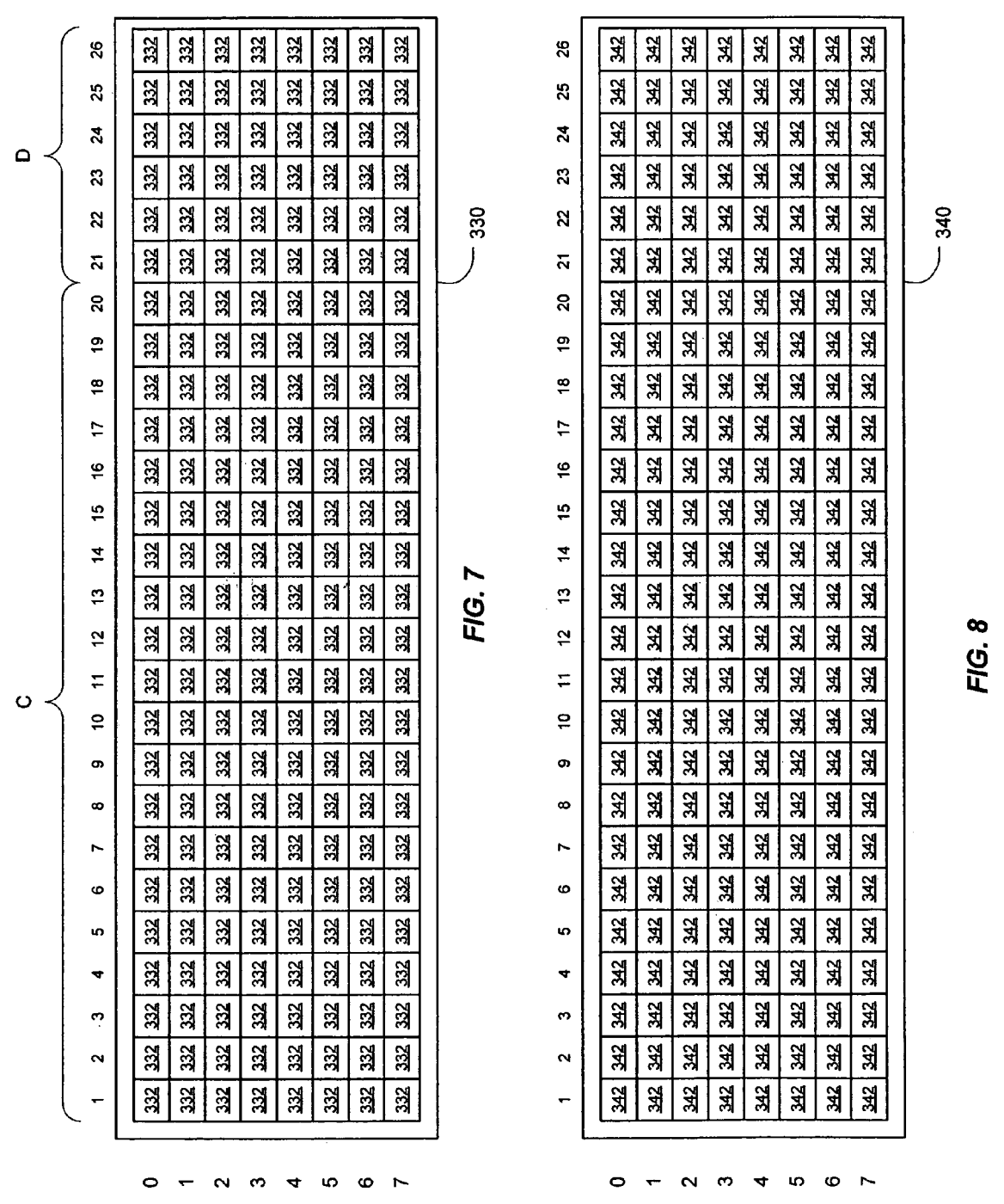

FIG. 7 shows an example of a boundary end field 330, in accordance with embodiments of the present invention. It will be understood that other embodiments may utilize different structures and algorithms than the examples shown. In FIG. 7, the boundary end field 330 comprises a plurality of blocks, arranged in stripes similar to the stripes in the envelopes 200. However, unlike the envelopes 200, the length of the boundary end field 330 may vary. In other words, while the envelope 200 shown in FIG. 2 has a length of 20 stripes, the boundary end field 330 in FIG. 7 has a length equal to the entire length of the last successfully written envelope (envelope C) plus the number of stripes that were successfully written in the partially written envelope (envelope D). For example, if the first six stripes of envelope D had been written, then the length of the boundary end field 330 would be 26 stripes, which corresponds to the 20 stripes in envelope C plus the 6 successfully written stripes of envelope D, as shown in FIG. 7.

In some embodiments, it may be desirable to store information corresponding to the length of the boundary end field 330 in the blocks 332 of data forming the boundary end field 330. This can be accomplished, for example, by storing an end flag in each stripe of data in the boundary end field 330. In one embodiment, the end flag for each stripe may comprise an indication of the total number of stripes in the boundary end field 330 and the sequential number of that particular stripe. This end flag may be stored in each block 332 in that stripe. For example, each of the eight blocks 332 in stripe 1 will include an end flag comprising information corresponding to "stripe 1 of 26 stripes". Next, each of the eight blocks 332 in stripe 2 will include information corresponding to "2 of 26", each of the eight blocks 332 in stripe 3 will include information corresponding to "3 of 26", and so forth until the stripe 26, which will include information corresponding to "26 of 26". By including this information in the blocks 332, during subsequent read operations the controller can easily identify if any of the stripes have been corrupted. It will be understood that this information may be stored in the blocks 332 in different ways and need not take the exact form described above.

In some embodiments, it may be desirable to provide the boundary start field 340 with a similar structure as the bounding end field 330, as shown in FIG. 8. Here, the length of the boundary start field 340 is equal to the length of the boundary end field 330. Similarly, each block 342 in each stripe of the boundary start field 340 will include a reference to the stripe number and a reference to the total number of stripes in the boundary start field 340. Thus, if any of the stripes in the boundary start field 340 are corrupted, the controller can easily identify the loss. Each block 342 in the boundary start field 340 may also include a start flag or other indicator so that the controller can easily determine where the defective region 320 ends and the boundary start field 340 begins.

For example, if during a read operation the controller encounters a boundary end field 330, the controller will begin monitoring the data contained in the blocks 332 of the boundary end field 330. First, the controller will store the expected length of the boundary end field 330 (e.g., the total number of stripes in the boundary end field 330). Then, as each block 332 is read, the controller will compare the expected stripe number with the observed stripe number. If, for example, after reading a stripe containing blocks 332 which indicate "25 of 26", the blocks 332 in the subsequent stripe do not contain the expected "26 of 26" indication, the controller will know that the defective region 320 has expanded backwards to corrupt the last stripe in the boundary end field 330. In some embodiments, it may also be desirable to include positional information in the boundary end field 330 indicating the physical location on the tape medium of the beginning of the defective region 320. This can be used in place of the stripe count described above, or to supplement the stripe count in order to provide additional redundancy.

In some embodiments, one or more of the blocks 332 in the boundary end field 330 may also include positional information regarding the physical location on the tape medium of the beginning of the boundary start field 340. This positional information may have been acquired and stored when the controller first encounters the defective region 320. During future read operations, when the controller encounters the boundary end field 330, the controller may obtain the physical location of the boundary start field 340 from the information stored in one or more or all of the blocks 332 in the boundary end field 330. This physical location information may be derived, for example, using tape address information calculated by the tape drive motor servo.

Once the end of the boundary end field 330 is reached, the controller will disregard subsequent data blocks until the controller reaches the physical address where the boundary start field begins. Then the controller may begin reading the data from the tape medium to search for a block 342 containing the start flag indicating that the boundary start field 340 has begun. In other embodiments, as the read head passes over the defective region 320, the controller may look for some sort of known flag in the boundary start field 340 in order to determine where the defective region 320 ends.

As with the boundary end block 330, the controller will read each block 342 in the boundary start block 340 to compare the expected stripe number with the observed stripe number. If, for example, the first stripe indicates "2 of 26", then the controller will know that the defective region 320 has expanded forward to corrupt the first stripe in the boundary start field 340. By making the boundary end field 330 the same length as the boundary start field 340, a redundant method of determining the boundary field sizes is provided.

In some embodiments, it may further be desirable to store the length and/or locations of the boundary end field 330 and boundary start field 340 in a separate directory, either elsewhere on the tape medium or on another storage device. This can provide a redundant record of the defective region and the boundary fields 330, 340.

In accordance with some embodiments, a method may be provided for managing defective regions on a tape medium and for monitoring those defective regions over time. This may advantageously enable the tape drives to continue to utilize tape storage devices containing minor defects. Without these methods, these slightly flawed tape storage devices may otherwise be considered as unusable, resulting lower tape yields and reduced efficiency caused by the need to relocate the data stored on the defective tape storage device onto a new tape storage device.

In accordance with some embodiments, a method may be provided to enable a tape drive to circumvent defective regions without the use of separately stored defect maps. The method may comprise the use of a boundary end field and a boundary start field bounding the beginning and end of the defective region. Accordingly, the tape drive does not need to have a defect map stored in a separate memory, nor does the tape drive need to rewind the tape medium to locate a defect map stored in a predetermined location on the tape medium. This method may be used "on the fly" during write operations and may be able to cope with defective regions of varying length.

While the invention has been described in terms of particular embodiments and illustrative figures, those of ordinary skill in the art will recognize that the invention is not limited to the embodiments or figures described. For example, in some of the embodiments described above, each entity comprises 16 data blocks and 4 ECC blocks, and each envelope comprises 8 entities. In other embodiments, these numbers may vary. For example, each entity may include greater or fewer data blocks and ECC blocks (or no ECC at all), and each envelope may include greater or fewer entities. In yet other embodiments, the envelope may comprise a plurality of data blocks (or data and ECC blocks) not grouped into separate entities. The structure of the envelopes and data stored in the envelopes in accordance with various embodiments of the present invention may vary, depending on the error correction algorithms desired.

In addition, in the process described above, the boundary end field has a length equal to the length of the last complete envelope written plus the length of the successfully written portion of the next envelope. Thus, the boundary end field will always have a length at least equal to the length of a single envelope. This extended length can help to insure that the boundary end field will be easily detectable during future read operations, even if the defective region expands to corrupt some of the stripes in the boundary end field. In other embodiments, the boundary end field may comprise a predetermined length. For example, every time a new boundary end field is created, it may be given a length of equal to the number of stripes in the other envelopes. In other examples, every boundary end field may be given a length of equal to 10 stripes or some other predefined value.

It is noted that the term "defective region" as used herein refers to a region of the tape medium that has been identified as being undesirable for the storage of data. This identification of the defective region may be as a result of detecting an actual defect in the region (e.g., a localized media anomaly) that makes the region incapable of reliably storing data. Alternatively, the identification of the defective region may be as a result of an expectation that the region has the potential for corrupting data and therefore should not be used. This expectation may arise, for example, after a predetermined number of data read errors have occurred in the region or some other statistical analysis. Accordingly, the "defective region" may be capable of storing data, but has been identified as "defective" in order to avoid potential data errors in the future.

It is further noted that the terms "before" and "after" have been used above to refer to the sequential locations for storing data on the tape medium. It is understood that during conventional operation, the tape medium may move in either direction during read and write operations. The terms "before" and "after" are used to refer to the locations along the tape path adjacent to the location of the defective region relative to the direction of movement of the tape medium during the operation being performed when the defective region is first encountered.

It is further noted that in various embodiments, the order of the steps may differ from the embodiments described above. For example, in the process shown in FIG. 5, the boundary start field 340 is written before the boundary end field 330. It may be desirable to rewrite the last successfully written envelope C' before repositioning the write head to write the boundary end field 330, in order to avoid writing over the initially written envelope C with the boundary end field 330 before storing the data from envelope C onto the tape medium. In other embodiments, the order of writing the boundary end field, the boundary start field, and the rewritten envelope C' may vary in any order.

It is also noted that in various implementations, the controller that controls the systems and methods herein may exist in various forms. In some embodiments, the tape drive controller 103 may provide the controlling function. In other embodiments, the storage subsystem controller 101 or a controller on the host 110 may provide the controlling function.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

The invention claimed is:

1. A method of storing data on a tape medium, comprising:
   writing a plurality of envelopes of data onto the tape medium, each envelope of data comprising a plurality of blocks of data;
   detecting a defective region of the tape medium;
   writing a boundary start field after the defective region, the boundary start field indicating that the defective region has been passed;
   writing a boundary end field before the defective region of the tape medium, the boundary end field indicating that the defective region follows the boundary end field, wherein at least one block of data in the boundary end field comprises information about an expected length of the boundary end field;
   ascertaining a readable length of the boundary end field; and
   comparing the ascertained readable length of the boundary end field to the expected length of the boundary end field to determine whether a size of the defective region has increased.

2. The method of claim 1, further comprising:
   writing an additional plurality of envelopes of data onto the tape medium after the boundary start field.

3. The method of claim 1, wherein:
   the writing the boundary end field before the defective region of the tape medium comprises replacing at least one complete envelope of data located before the defective region with the boundary end field.

4. The method of claim 3, wherein:
   said detecting the defective region of the tape medium comprises detecting the defective region after successfully writing a partial envelope of data before the defective region;
   said replacing at least one complete envelope of data located before the defective region comprises replacing one complete envelope of data and the partial envelope of data with the boundary end field.

5. The method of claim 1, wherein:
   at least one block of data in the boundary end field comprises positional information regarding a physical location of the boundary start field.

6. The method of claim 1, wherein:
   at least one block of data in the boundary start field comprises information about an expected length of the boundary start field.

7. The method of claim 1, wherein:
   at least one block of data in the boundary start field comprises positional information regarding a physical location of the boundary end field.

8. The method of claim 1, further comprising:
   tracking a size of the defective region over time.

9. The method of claim 1, further comprising:
   storing a length of the boundary end field in a location separate from a location of the boundary end field location.

10. The method of claim 9, wherein:
    the storing the length of the boundary end field comprises storing the length of the boundary end field on a separate storage device.

11. A method of storing data on a tape medium, comprising:
    writing a plurality of envelopes of data onto the tape medium, each envelope of data comprising a plurality of blocks of data;
    detecting a defective region of the tape medium;
    writing a boundary start field after the defective region, the boundary start field indicating that the defective region has been passed, wherein at least one block of data in the boundary start field comprises information about an expected length of the boundary start field;

writing a boundary end field before the defective region of the tape medium, the boundary end field indicating that the defective region follows the boundary end field;

ascertaining the readable length of the boundary start field; and comparing the ascertained readable length of the boundary start field to the expected readable length of the boundary start field to determine whether a size of the defective region has increased.

12. A tape storage system for storing data on a tape medium, comprising:

a data transducer for writing data onto the tape medium;

a motor for translating the tape medium across the data transducer; and a controller for controlling the data transducer and the motor such that the tape storage system writes a plurality of envelopes of data onto the tape medium, each envelope of data comprising a plurality of blocks of data, and further such that when a defective region of the tape medium is detected, a boundary start field is written onto the tape medium after the defective region, the boundary start field indicating that the defective region has been passed, and a boundary end field is written before the defective region of the tape medium, the boundary end field indicating that the defective region follows the boundary end field, wherein the controller further controls the data transducer and the motor to:

write the boundary end field such that at least one block of data in the boundary end field comprises information about an expected length of the boundary end field;

ascertain a readable length of the boundary end field; and compare the ascertained readable length of the boundary end field to the expected length of the boundary end field to determine whether a size of the defective region has increased.

13. The system of claim 12, wherein the controller controls the data transducer and the motor to continue writing an additional plurality of envelopes of data onto the tape medium after the boundary start field.

14. The system of claim 12, wherein the controller controls the data transducer and the motor to write the boundary end field before the defective region of the tape medium by replacing at least one complete envelope of data located before the defective region with the boundary end field.

15. The system of claim 14, wherein the controller controls the data transducer and the motor to write the boundary end field such that the boundary end field has a length equal to a length of the one complete envelope of data and a partial envelope of data.

16. The system of claim 12, wherein the controller controls the data transducer and the motor to write the boundary end field such that at least one block of data in the boundary end field comprises positional information regarding a physical location of the boundary start field.

17. The system of claim 12, wherein the controller controls the data transducer and the motor to write the boundary start field such that at least one block of data in the boundary start field comprises information about an expected length of the boundary start field.

18. The system of claim 12, wherein the controller controls the data transducer and the motor to write the boundary start field such that at least one block of data in the boundary start field comprises positional information regarding a physical location of the boundary end field.

19. The system of claim 12, wherein the controller controls the data transducer and the motor to write the boundary end field to:

ascertain the readable length of the boundary start field; and compare the ascertained readable length of the boundary start field to the expected readable length of the boundary start field to determine whether a size of the defective region has increased.

* * * * *